(12) United States Patent
Agardh et al.

(10) Patent No.: US 7,801,100 B2
(45) Date of Patent: Sep. 21, 2010

(54) OPERATING AD-HOC WIRELESS LOCAL AREA NETWORKS USING NETWORK IDENTIFIERS AND APPLICATION KEYS

(75) Inventors: Kare Andreas Agardh, Rydeback (SE); Charles Liu, Chapel Hill, NC (US)

(73) Assignee: Sony Ericsson Mobile Communications AB (SE)

( * ) Notice: Subject to any disclaimer, the term of this patent is extended or adjusted under 35 U.S.C. 154(b) by 630 days.

(21) Appl. No.: 11/809,982

(22) Filed: Jun. 4, 2007

(65) Prior Publication Data

US 2008/0298375 A1    Dec. 4, 2008

(51) Int. Cl.
*H04W 4/00* (2009.01)
*H04L 12/28* (2006.01)
*H04L 12/56* (2006.01)
*G06F 15/16* (2006.01)

(52) U.S. Cl. .................. 370/338; 370/254; 370/397; 709/229

(58) Field of Classification Search .............. 370/338, 370/254, 397; 455/455, 432; 709/229
See application file for complete search history.

(56) References Cited

U.S. PATENT DOCUMENTS 7,535,880 B1 * 5/2009 Hinman et al. .............. 370/338

2006/0067290 A1 * 3/2006 Miwa et al. ................. 370/338
2007/0254614 A1 * 11/2007 Muralidharan et al. ....... 455/307

FOREIGN PATENT DOCUMENTS

EP   1 487 224 A1   12/2004
EP   1 624 619 A1   2/2006

OTHER PUBLICATIONS

Notification of Transmittal of the International Search Report and the Written Opinion of the International Searching Authority, or the Declaration, International Search Report, Written Opinion of the International Searching Authority, PCT/US2007/023379, Jun. 10, 2008.

* cited by examiner

*Primary Examiner*—Nick Corsaro
*Assistant Examiner*—Manpreet S Matharu
(74) *Attorney, Agent, or Firm*—Myers Bigel Sibley & Sajovec, P.A.

(57) ABSTRACT

Methods wireless communication terminals are disclosed that operate an ad-hoc wireless local area network. A network identifier and an application key are maintained within a first wireless communication terminal. The application key is defined for at least one application program hosted on the first wireless communication terminal. An ad-hoc wireless local area network is established between the first wireless communication terminal and a second wireless communication terminal using the network identifier and the application key.

16 Claims, 4 Drawing Sheets

OPERATING AD-HOC WIRELESS LOCAL AREA NETWORKS USING NETWORK IDENTIFIERS AND APPLICATION KEYS

FIELD OF THE INVENTION

The present invention relates to the field of communications in general, and, more particularly, to operation of ad-hoc wireless local area networks between communication devices.

BACKGROUND OF THE INVENTION

Wireless Local Area Networks (WLANs) have emerged as one of the preferred technologies for networking wireless communication terminals to one another and to other networks (e.g., the Internet). Exemplary wireless communication terminals can include devices such as laptop computers, desktop computers, palmtop computers, tablet computers, and/or cellular voice/data phones. WLAN communication terminals typically operate according to the IEEE 802.11 specifications and communicate with one another using spread-spectrum radio communications in a defined frequency band such as, for example, 2.4 GHz. WLAN communication terminals which comply with IEEE 802.11 may selectively operate in an infrastructure mode or an ad-hoc mode.

In the infrastructure mode, a WLAN access point (WAP) serves as a network master that sets-up and manages communications among the WLAN communication terminals within its service area, and may communicatively interface the WLAN communication terminals to one another and/or to another network, such as the Internet. All communications between the networked communication terminals are controlled by the WAP.

In contrast, in the ad-hoc mode, WLAN communication terminals form dynamically self-organizing and temporary network topologies. The WLAN communication terminals communicate directly with each other without use of a WAP. For this reason, the ad-hoc mode is also referred to as peer-to-peer mode.

The ad-hoc mode is not widely used because it suffers from a relatively complex user setup process in order to initially configure two or more of the WLAN communication terminals to communicate with one another through a secure interface. To establish a secure interface, one of the WLAN communication terminals must broadcast a common ad-hoc network name (e.g., service set identifier (SSID)) that is correctly searched for and identified by the other WLAN communication terminals. Setting-up the common ad-hoc network name on each of the WLAN communication terminals and establishing the ad-hoc network therebetween can be relatively complex and can be a time consuming burden on users to carry-out each time an ad-hoc network is desired.

SUMMARY OF THE INVENTION

Some embodiments of the present invention are directed to methods of operating an ad-hoc WLAN. A network identifier and an application key are maintained within a first wireless communication terminal. The application key is defined for at least one application program hosted on the first wireless communication terminal. An ad-hoc WLAN is established between the first wireless communication terminal and a second wireless communication terminal using the network identifier and the application key.

In some further embodiments, the network identifier and the application key are broadcast from the first wireless communication terminal as an ad-hoc network connection request. A network identifier and an application key are received from the second wireless communication terminal, where the received application key is defined for an application program hosted on the second wireless communication terminal. The ad-hoc WLAN is established between the first and second wireless communication terminals in response to the application key broadcast by the first wireless communication terminal matching the application key received from the second wireless communication terminal. Data is communicated through the ad-hoc WLAN between the corresponding application programs hosted on the first and second wireless communication terminals.

The network identifier may include a Service Set IDentifier (SSID). The ad-hoc WLAN may be established by combining the SSID and the application key to form a combined SSID, and broadcasting the combined SSID from the first wireless communication terminal as an IEEE 802.11 formatted ad-hoc network connection request.

The ad-hoc WLAN may alternatively be established by appending the application key to the SSID to form a combined SSID, and broadcasting the combined SSID from the first wireless communication terminal as an ad-hoc network connection request. A broadcast message can be received by the first wireless communication terminal from the second wireless communication terminal that includes a combined SSID having an SSID from the second wireless terminal and an application key defined for an application program hosted on the second wireless communication terminal. In response to the combined SSID that is broadcast by the first wireless communication terminal matching the combined SSID received from the second wireless communication terminal, the ad-hoc WLAN can be established between the first and second wireless communication terminals and data can be communicated through the ad-hoc WLAN between the corresponding application programs hosted on the first and second wireless communication terminals.

A plurality of application keys can be maintained within the first communication terminal, where each of the application keys is defined for a different one of a plurality of application programs hosted on the first communication terminal. In response to executing a selected one of the application programs, the application key defined for the selected application program can be broadcast from the first wireless communication terminal in an attempt to establish an ad-hoc WLAN between the first wireless communication terminal and the second wireless communication terminal and to initiate communication between the selected application program and an application program on the second wireless communication terminal having an application key that corresponds to the application key of the selected application program. An ad-hoc WLAN can be established between the first wireless communication terminal and a second wireless communication terminal using their network identifiers and selected application keys. In response to establishing the ad-hoc WLAN, data can be communicated through the ad-hoc WLAN between the selected application program hosted on the first wireless communication terminal and the application program on the second wireless communication terminal having the application key that corresponds to the application key of the selected application program. A security kernel within the first wireless communication terminal can be used to block application programs hosted on the second wireless communication terminal from accessing application programs in the first wireless communication terminal that having application keys that do not match the application key of the selected application program.

In some further embodiments, data is communicated through the ad-hoc WLAN between application programs hosted on the first and second wireless communication terminals that are associated with the application key. Data is prevented from being communicated through the ad-hoc WLAN between application programs hosted on the first and second wireless communication terminals that have application keys that do not match the application key of the selected application program.

Some other embodiments of the present invention are directed to a wireless communication terminal that includes a transceiver, a memory, and a WLAN controller. The transceiver is configured to transmit and receive RF signals. The memory includes at least one application program and an application key associated with the at least one application program. The WLAN controller is configured to establish an ad-hoc WLAN with another wireless communication terminal through the transceiver using the network identifier and the application key.

The WLAN controller may be further configured to broadcast the network identifier and the application key through the transceiver as an ad-hoc network connection request, to establish the ad-hoc WLAN with the other wireless communication terminal in response to the application key broadcast from the wireless communication terminal matching an application key received through the transceiver from the other wireless communication terminal, where the received application key corresponds to an application program hosted on the second wireless communication terminal, and configured to communicate data through the established ad-hoc WLAN between the application programs hosted on the wireless communication terminals which correspond to the broadcasted and received application keys.

The network identifier in the memory may include a Service Set IDentifier (SSID), and the WLAN controller may be further configured to combine the SSID and the application key to form a combined SSID, and to broadcast the combined SSID through the transceiver as an IEEE 802.11 formatted ad-hoc network connection request. The WLAN controller may be further configured to append the application key to the SSID to form the combined SSID broadcast as the IEEE 802.11 formatted ad-hoc network connection request.

The WLAN controller may be further configured to receive, via the transceiver in a broadcast message from the other wireless communication terminal, from the other wireless terminal a combined SSID that includes an SSID and an application key defined for an application program hosted on the other wireless communication terminal, and, in response to the combined SSID that is broadcast by the wireless communication terminal matching the combined SSID received from the other wireless communication terminal, to establish the ad-hoc WLAN between the wireless communication terminals and communicate data through the ad-hoc WLAN between the corresponding application programs hosted on the wireless communication terminals.

The memory may further include a plurality of application programs and a plurality of application keys, where each of the application keys is defined for a different one of the plurality of application programs. The WLAN controller may be further configured to respond to execution of a selected one of the application programs by broadcasting the application key defined for the selected application program through the transceiver in an attempt to establish an ad-hoc WLAN with the other wireless communication terminal and initiate communication between the selected application program and an application program on the other wireless communication terminal having an application key that corresponds to the application key of the selected application program.

The WLAN controller may be further configured to establish an ad-hoc WLAN between the wireless communication terminals using their network identifiers and selected application keys, and, in response to establishing the ad-hoc WLAN, to communicate data through the ad-hoc WLAN between the selected application program and the application program on the other wireless communication terminal having the application key that corresponds to the application key of the selected application program.

The wireless communication terminal may further include a security kernel that is configured to block application programs hosted on the other wireless communication terminal from accessing application programs in the memory that have application keys that do not match the application key of the selected application program.

The wireless communication terminal may further include a cellular transceiver that is configured to transmit and receive cellular communication signals, and a cellular controller that is configured to communicate according to a cellular communication protocol with a cellular base station. The WLAN controller can be further configured to initiate establishment of the ad-hoc WLAN with the other wireless communication terminal in response to a message received through the cellular controller and the cellular transceiver from the cellular base station.

Some other embodiments of the present invention are directed to a wireless communication terminal that includes a transceiver, a memory, a WLAN controller, and a security kernel. The transceiver is configured to transmit and receive RF signals. The memory includes a network identifier, a first application program, a first application key defined for the first application program, a second application program, and a second application key defined for the second application program. The WLAN controller is configured to establish an ad-hoc WLAN with another wireless communication terminal through the transceiver using the network identifier and the first application key. The security kernel is configured to authorize data to be communicated through the ad-hoc WLAN between the first application program and an application program hosted on the other wireless communication terminal having an application key matching the first application key, and to block other application programs hosted on the other wireless communication terminal and which have application keys that do not match the first application key from accessing the first application program in the memory.

In some further embodiments, the security kernel is further configured to authorize data to be communicated through the ad-hoc WLAN between the second application program and an application program hosted on the other wireless communication terminal having an application key matching the second application key.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
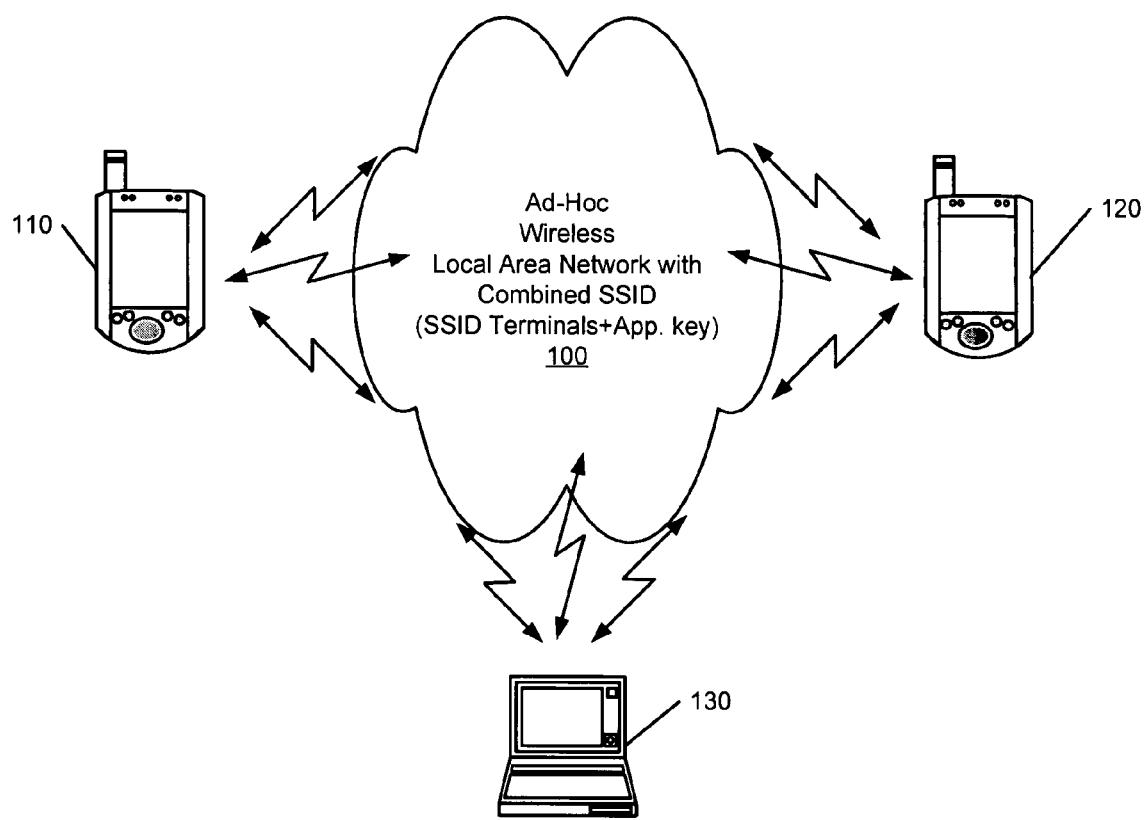
FIG. 1 is a block diagram of a plurality of wireless communication terminals that establish and operate an ad-hoc WLAN using a combined network identifier that is formed using an application key and a terminal SSID according to some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another elements, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Various embodiments of the present invention are directed to establishing an ad-hoc WLAN between a plurality of wireless communication terminals (hereinafter "wireless terminals") using an application key that is defined for at least one application program that is hosted on each of the wireless communication terminals. FIG. 1 is a block diagram of three wireless communication terminals 110, 120, and 130 that establish and communicate across an ad-hoc WLAN 100 using a combined network identifier that is formed using an application key and a terminal network identifier, such as a Service Set IDentifier (SSID), according to some embodiments of the present invention.

The wireless terminals 110, 120, and 130 are configured to carry out communications according to one or more WLAN protocols, such as according to one or more of the IEEE 802.11 standards (e.g., 802.11a/b/g/n) and may be further configured to carry out communications according to one or more cellular radiotelephone protocols. Accordingly, exemplary wireless terminals may include, but are not limited to, electronic gaming terminals, cellular phones, cellular data terminals, desktop/laptop/palmtop/tablet computers with WLAN communication circuitry. The wireless terminals may include, without limitation, additional functionality that provides Internet/intranet access and browser capabilities, wireless voice communication (e.g., Voice Over Internet Protocol), wireless email, wireless messaging, videoconferencing communication capabilities, and/or Personal Data Assistant capabilities (e.g., contact information management, task management, and/or schedule management).

Referring to FIG. 1, each of the wireless terminals 110, 120, and 130 includes an SSID which can be used as a network ID to establish an ad-hoc WLAN in a conventional manner in accordance with the IEEE 802.11 protocol. Moreover, in accordance with some embodiments of the present invention, the wireless terminals 110, 120, and 130 are configured to form the ad hoc WLAN 100 using an application key that is defined for at least one application program hosted on each of the wireless terminals 110, 120, and 130.

For example, the wireless terminals 110, 120, and 130 can each include an application program with an associated application key that is common (e.g., may be the same) across the wireless terminals 110, 120, and 130. In response to running a selected application hosted on the wireless terminal 110, the wireless terminal 110 may broadcast an ad-hoc WLAN request beacon message using a network name that is based on the application key of the selected application program. In response to running the corresponding application programs hosted on the other wireless terminals 120 and 130, those terminals can search for the WLAN request beacon message from wireless terminal 110 having a network name based on the common application key of the application programs hosted on each of the wireless terminals 120 and 130. Upon identifying the WLAN request beacon message, the wireless terminals 120 and 130 can transmit a WLAN response message (which can include their application keys and terminal SSIDs) to the wireless terminal 110 to cause the WLAN 100 to become established therebetween. The corresponding application programs on each of the wireless terminals 110, 120, and 130 can then transmit/receive data between the corresponding application programs across the WLAN 100.

Accordingly, it has been discovered that a common application key in the wireless terminals 110, 120, and 130 can be used to establish an application program specific ad-hoc WLAN 100 between the wireless terminals 110, 120, and 130 and to initiate communications between the corresponding hosted application programs. Moreover, for such an application specific ad-hoc WLAN, the wireless terminals 110, 120, and 130 may restrict communications to occurring between those application programs that have the common application key. A wireless terminal may therefore, for example, block an attempt by an application program, which has an application key that is different from the common application key, from using the established ad-hoc WLAN 100 to access (e.g., communicate data/instructions to) one or more application programs on the wireless terminal. Thus, use of the established ad-hoc WLAN 100 may be restricted to only application programs that correspond to the common application key, with other application programs being blocked from using that ad-hoc WLAN 100.

Figure 2:
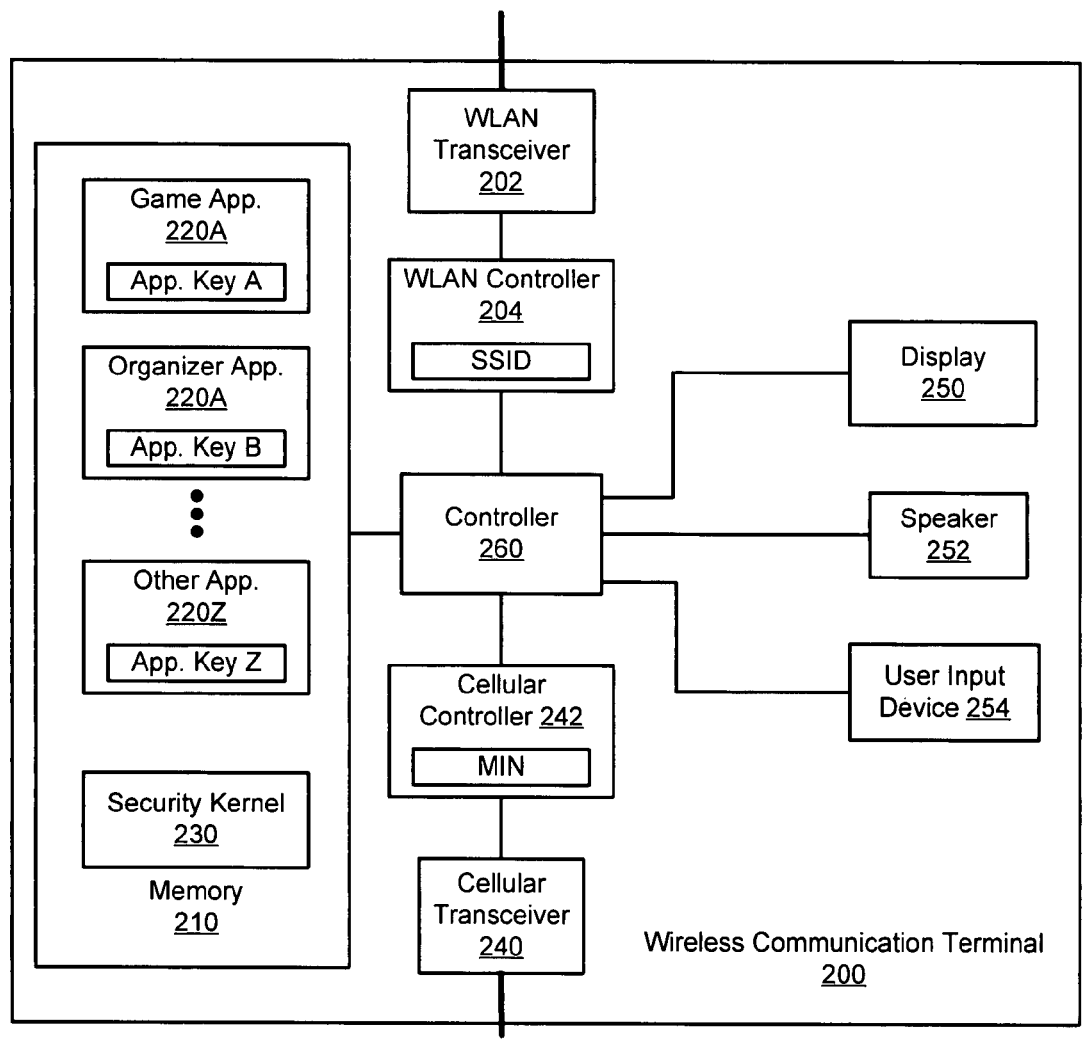
FIG. 2 is a schematic block diagram of a wireless communication terminal that establishes an ad-hoc WLAN using an application key of a selected application program according to some embodiments of the present invention, and which may be appropriate for use as one or more of the terminals shown in FIG. 1.

FIG. 2 is a schematic block diagram of a wireless terminal 200 that establishes an ad-hoc WLAN using an application key of a selected application program according to some embodiments of the present invention, and which may be appropriate for use as one or more of the terminals 110, 120, and 130 shown in FIG. 1.

Referring to FIG. 2, the wireless terminal 200 includes a WLAN transceiver that is configured to transmit/receive RF signals in one or more frequency bands that are allocated for WLAN communications. A WLAN controller 204 is configured to communicate through the WLAN transceiver 202 across a wireless air interface with one or more other wireless terminals according to one or more WLAN protocols, which may at least partially comply with one or more of the IEEE 802.11 standards (e.g., 802.11a/b/g/n). The WLAN controller 204 includes a defined SSID, which may reside within the WLAN controller 204 itself or it may be accessed in a separate memory 210. The WLAN controller 204 can search for an available ad-hoc WLAN based on the SSID and, if an existing ad-hoc WLAN that corresponds to the SSID is not identified, may broadcast an ad-hoc WLAN request message that identifies the SSID to attempt to establish an ad-hoc WLAN with one or more other wireless terminals. The ad-hoc WLAN request message may be a beacon message that is repeatedly transmitted, such as at a defined periodic rate.

The wireless terminal 200 also includes a plurality of application programs, residing in the memory 210, which are each associated with defined application keys, where each of application programs may be associated with a different defined application key or one or more of application programs may be associated with a common (e.g., may be the same/identical) application key. For example, as shown in FIG. 2, the memory 210 may include application programs 220 A-Z that are each associated with different application keys A-Z. The application programs include a game application program 220A associated with application key A, an organizer application program 220B associated with application key B, and another application program 220Z associated with application key Z. The memory 210 may further include a security kernel 230 that controls access to application programs and other resources in the wireless terminal 200 by other communication terminals through one or more ad-hoc WLANs that are established therewith. A controller 260, which may be a general/specific purpose processor, is configured to execute the application programs 220 A-Z to carry out their defined functionalities.

Although the memory 210 has been illustrated as a single element for ease of illustration and explanation, it is not limited thereto. Indeed, the application programs A-Z and/or the security kernel 230 may be distributed across two or more memory elements which may be organized into a hierarchical memory topology.

In accordance with some embodiments, The WLAN controller 204 can use an application key of a selected (e.g., executing) application program to search for a broadcasted WLAN request message that indicates that an ad-hoc WLAN is available that has a network identifier that corresponds to the application key ("selected application key") of the selected application program. If no such ad-hoc WLAN that corresponds to the selected application key is identified, the WLANs controller 204 may broadcast an ad-hoc WLAN request message, which identifies the selected application key, to attempt to establish an ad-hoc WLAN with one or more other wireless terminals that host an application program having an application key that matches (e.g., may be the same/identical as) the selected application key. The ad-hoc WLAN request message may be a beacon message that is repetitively transmitted, such as at a defined periodic rate. The WLAN controller 204 may search for an existing ad-hoc WLAN that corresponds to a combination of the selected application key and the SSID. The WLAN controller 204 may combine the selected application key and the SSID, such as by appending the application key to the SSID, to form a combined SSID, and may broadcast the combined SSID in the ad-hoc WLAN request message.

The WLAN controller 204 may search for and/or establish an ad-hoc WLAN in response to a controller 260 executing a selected one of application programs 220 A-Z. For example, when one of the executing application programs wants to communicate with a corresponding application program on another wireless terminal, the controller 260 may cause the WLAN controller 204 to search for and establish an ad-hoc WLAN thereto based on the application key of the executing application program. The corresponding application programs on each of the wireless terminals may then communicate with one another to transmit/receive data/instructions through the corresponding ad-hoc WLAN.

As will be described in further detail below, the security kernel 230 may restrict communications to occurring between the corresponding application programs having a common application key. The security kernel 230 may, for example, block an attempt by an application program, which has an application key that is different from the common application key, from using the established ad-hoc WLAN to access (e.g., communicate data/instructions to) one or more application programs on the wireless terminal 200. Thus, use of an established ad-hoc WLAN between the wireless terminals may be restricted to only application programs that correspond to the common application key, with other application programs being blocked from using that ad-hoc WLAN. Alternatively or additionally, the security kernel 230 may allow application programs on different wireless terminals having common application keys to communicate with one another through the ad hoc WLANs, while blocking communications between application programs on different wireless terminals that have different application keys.

Thus, for example, the security kernel 230 may allow the game application 220A having application key A on wireless terminal 200 to communicate through an ad-hoc WLAN with a corresponding game application having the same application key A on another wireless terminal. The security kernel 230 may block an organizer application having an application key B on another wireless terminal from communicating through an ad-hoc WLAN with the game application 220A, and may allow the organizer application having application key B on the other wireless terminal to communicate with organizer application 220A having the same application key B on the wireless terminal 200.

The wireless terminal 200 may include a cellular transceiver 240 that is configured to transmit/receive RF signals in one or more frequency bands that are allocated for cellular communications. A cellular controller 242 is configured to communicate through the cellular transceiver 240 according to one or more cellular protocols, which may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The cellular controller 242 may include a mobile identification number "MIN" that uniquely identifies the wireless terminal 200 to a cellular base station.

The controller 260 may initiate establishment of an ad-hoc WLAN with another wireless terminal in response to a message received through the cellular controller 242 and a cellular transceiver 240 from a cellular base station. The controller 260 may further operably interconnect communications between the ad-hoc WLAN and a cellular network. For example, one or more of application programs A-Z, such as the game application 220A, may be caused to execute in response to a message that is received from a cellular base station via the cellular transceiver 240 and the cellular controller 242. In response to initiating execution of application program, such as the game application 200A, the WLAN controller 204 may initiate searching for an ad-hoc WLAN having a network name that is based on the application key of the executing application program, such as application key A. The WLAN controller 204 may also initiate the establishment of an ad hoc WLAN with another communication terminal that hosts a corresponding application program having a common application key, such as an application key A, such as described above and as further described below with regard to FIG. 3.

The wireless terminal 200 may include a display 250, a speaker 252, and a user input device 254 (e.g., buttons, keypad, keyboard, joystick, and/or touch sensitive interface). The controller 260 may operably interconnect and manage the functionality provided by the above described elements of the wireless terminal 200.

Although FIG. 2 illustrates an exemplary wireless terminal, it will be understood that the present invention is not limited to such configuration, but is intended to encompass any configuration capable of carrying out at least some of the operations described herein. For example, although separate functional blocks have been illustrated for the WLAN transceiver 202, the WLAN controller 204, the memory 210, the cellular transceiver 240, the cellular controller 242, and the controller 260, for ease of illustration and explanation, it is to be understood that their associated functionality may be integrated within one or more common integrated circuits.

Figure 3:
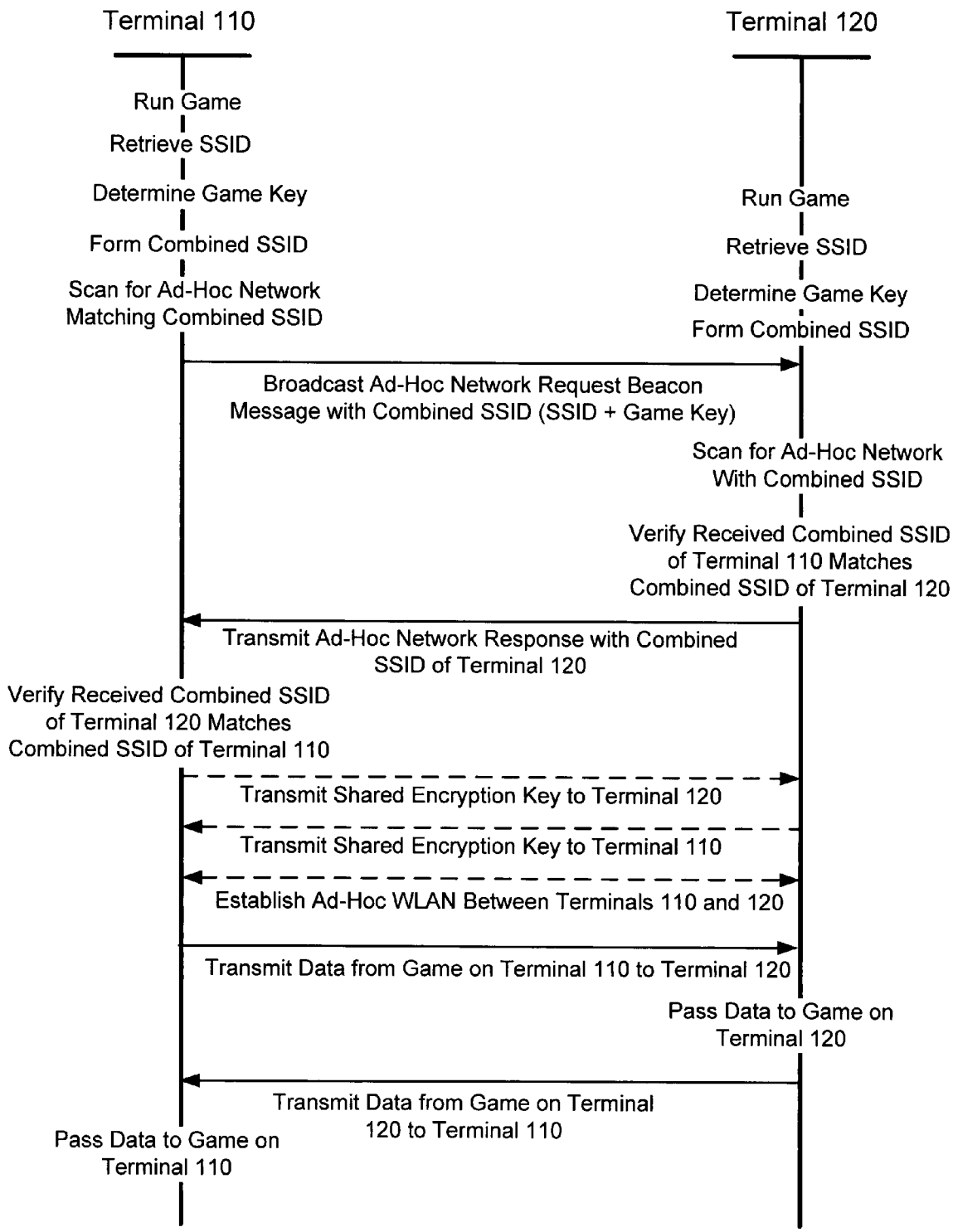
FIG. 3 is a data/message flow diagram that illustrates operations and methods that may be carried out by wireless communication terminals, such as the terminals shown in FIGS. 1 and 2, to establish and operate an ad-hoc WLAN according to some embodiments of the present invention.

Further operations and methods that may be carried out to establish and communicate across an ad-hoc WLAN between two or more wireless terminals will now be described in the context of setting-up and carrying-out communication between gaming application programs that are hosted on two wireless terminals. FIG. 3 is a data flow diagram that illustrates exemplary operations and methods that may be carried out by, for example, the terminals 110 and 120 shown in FIG. 1 to establish and operate an ad-hoc WLAN.

Referring to FIG. 3, the game application 220A running on wireless terminal 110 attempts to communicate with a corresponding game application on another wireless terminal. In response to the attempted communication, the wireless terminal 110 retrieves the terminal SSID and determines the key ("application key A") that is defined for the game 220A. The wireless terminal 110 forms a combined SSID by appending the application key to the terminal SSID. The wireless terminal 110 searches for an existing ad-hoc WLAN or pending setup-request by scanning for an ad-hoc WLAN broadcast message containing a network name that matches the combined SSID. In response to not finding a matching network name, the wireless terminal 110 broadcasts an ad-hoc WLAN request beacon message containing the combined SSID (terminal SSID+game key A).

As shown in FIG. 3, a corresponding game 220A running on wireless terminal 120 similarly attempts to communicate with a corresponding game application on another wireless terminal. The wireless terminal 120 similarly responds to the attempted communication by retrieving the terminal SSID, determining the defined game key A, and forming a combined SSID therefrom. The wireless terminal 120 then scans for an ad-hoc WLAN broadcast message containing a network name matching the combined SSID, and receives the broadcast ad-hoc WLAN request beacon message from the wireless terminal 110. The wireless terminal 120 determines that the received combined SSID from terminal 110 matches the combined SSID of terminal 120. The wireless terminal 120 response to the match by transmitting an ad-hoc WLAN response containing the combined SSID of the wireless terminal 120.

The wireless terminal 110 verifies that the received combined SSID from wireless terminal 120 matches the combined SSID of the wireless terminal 110, and may respond to the match by transmitting a shared encryption key to the wireless terminal 120. Responsive thereto, the wireless terminal 120 may similarly transmit a shared encryption key to the wireless terminal 110. The wireless terminals 110 and 120 may exchange further information to establish an ad hoc WLAN therebetween.

Accordingly, the games 220A hosted on each of the wireless terminals 110 and 120 may now communicate with one another to exchange data/instructions. For example, the game 220A hosted on wireless terminal 110 can transmit data to wireless terminal 120, which is passed to the corresponding game 220A thereon. The game 220A hosted on wireless terminal 120 can similarly transmit data to the wireless terminal 110, which is passed to the corresponding game 220A thereon.

As explained above, the wireless terminals 110, 120, and 130 of FIG. 1 may include a security kernel 230 (FIG. 2) that controls access to application programs and other resources in each of the wireless terminals 110, 120, and 130 by other ones of the wireless terminals 110, 120, and 130 through one or more ad-hoc WLANs that are established there between. For example, the security kernel 230 may restrict communications to occurring between application programs having a common application key. The security kernel 230 may, for example, block an attempt by an application program on another wireless terminal, which has an application key that is different from the common application key, from using an established ad-hoc WLAN to access (e.g., communicate data/instructions to) one or more application programs on the wireless terminal that is hosting the security kernel 230. Thus, use of an established ad-hoc WLAN between the wireless terminals 110, 120, and 130 may be restricted to only application programs that correspond to the common application key, with other application programs being blocked from using that ad-hoc WLAN.

Thus, for example, the security kernel 230 may allow the game application 220A having application key A on wireless terminal 200 to communicate through an ad-hoc WLAN with a corresponding game application having the same application key A on another wireless terminal. The security kernel 230 may block an organizer application having an application key B on another wireless terminal from communicating through an ad-hoc WLAN with the game application 220A, and may allow the organizer application having application key B on the other wireless terminal to communicate with organizer application 220A having the same application key B on the wireless terminal 200.

Figure 4:
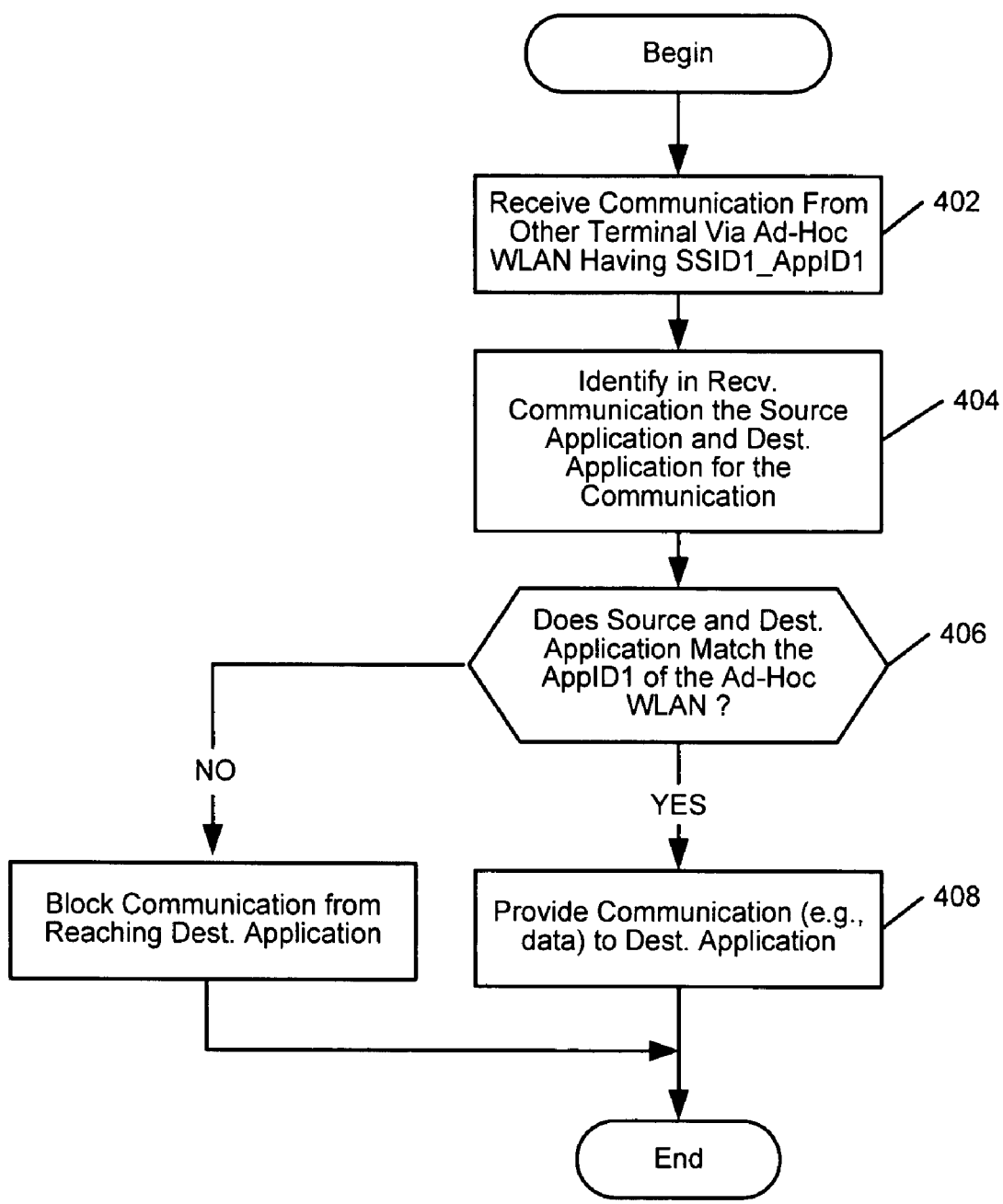
FIG. 4 is a flowchart illustrating operations and methods, which may be carried out by the security kernel and the wireless communication terminal of FIG. 2, for controlling access to application programs and other resources in the wireless communication terminal according to some embodiments of the present invention.

FIG. 4 is a flowchart illustrating operations and methods, which may be carried out by the security kernel 230 to control access to application programs and other resources in the wireless communication terminal 200 (FIG. 2). At block 402, communication is received from another wireless terminal via an ad-hoc WLAN having a network name containing a combined SSID and application key of "SSID1_AppID1". At block 404, the security kernel 230 analyzes the received communication to identify the source application of the application and the destination application for which the communication is directed. At block 406, the security kernel 230 determines whether the key for the source application and the key for the destination application matches the application key "AppID1" of the WLAN. If so, then at block 408, the security kernel 230 provides the communication to the destination application. Otherwise, at block 410, the security kernel 230 blocks the communication from reaching the destination application.

Various embodiments of the present invention have described in part above with reference to flowchart illustrations and/or block diagrams of apparatus, methods, and computer program products. It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved. Moreover, the functionality of a given block of the flowcharts and/or block diagrams may be separated into multiple blocks and/or the functionality of two or more blocks of the flowcharts and/or block diagrams may be at least partially integrated. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus (referred to herein as a "controller") to produce a machine, such that the instructions, which execute via the processor of the computer or other programmable data processing apparatus, create means for implementing the functions/acts specified in the flowchart and/or block diagram block or blocks.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of operating an ad-hoc Wireless Local Area Network (WLAN), the method comprising:
    maintaining a network identifier within a WLAN controller of a first wireless communication terminal;
    maintaining a plurality of application keys within a memory of the first wireless communication terminal, wherein each of the application keys is defined for a different one of a plurality of application programs hosted on the first wireless communication terminal, and the memory is separate from the WLAN controller; and
    establishing an ad-hoc WLAN between the first wireless communication terminal and a second wireless communication terminal using the network identifier and a first application key, wherein the first application key is one of the plurality of application keys, defined for a selected one of the application programs, wherein establishing the ad-hoc WLAN further comprises:
        appending the first application key to the network identifier to form a combined network identifier; and
        in response to executing the selected application program, broadcasting the combined network identifier as a WLAN request from the first wireless communication terminal in an attempt to establish the ad-hoc WLAN and initiate communication between the selected application program and an application program on the second wireless communication terminal having a second application key that corresponds to the first application key.

2. The method of claim 1, wherein establishing an ad-hoc WLAN comprises:
    receiving from the second wireless communication terminal;
    establishing the ad-hoc WLAN between the first and second wireless communication terminals in response to the first application key broadcast by the first wireless communication terminal matching the second application key received from the second wireless communication terminal; and
    communicating data through the ad-hoc WLAN between the corresponding application programs hosted on the first and second wireless communication terminals.

3. The method of claim 2, wherein the combined network identifier comprises a combined Service Set IDentifier (SSID), and wherein broadcasting the WLAN request comprises:
    broadcasting the combined SSID from the first wireless communication terminal as an IEEE 802.11 formatted ad-hoc network connection request.

4. The method of claim 1, wherein the combined network identifier comprises a combined Service Set IDentifier (SSID), and wherein broadcasting the WLAN request comprises:
    broadcasting the combined S SID from the first wireless communication terminal as an ad-hoc network connection request.

5. The method of claim 4, wherein establishing an ad-hoc WLAN further comprises:
    receiving, in a broadcast message from the second wireless communication terminal, the combined SSID from the second wireless terminal and the second application key defined for the application program hosted on the second wireless communication terminal; and
    in response to the combined SSID that is broadcast by the first wireless communication terminal matching the combined SSID received from the second wireless communication terminal, establishing the ad-hoc WLAN between the first and second wireless communication terminals and communicating data through the ad-hoc WLAN between the corresponding application programs hosted on the first and second wireless communication terminals.

6. The method of claim 1, further comprising:
    in response to establishing the ad-hoc WLAN, communicating data through the ad-hoc WLAN between the selected application program hosted on the first wireless communication terminal and the application program on the second wireless communication terminal having the second application key that corresponds to the first application key.

7. The method of final claim 6, further comprising using a security kernel within the first wireless communication terminal to block application programs hosted on the second wireless communication terminal from accessing application programs in the first wireless communication terminal that have application keys that do not match the first application key.

8. The method of claim 1, further comprising:
communicating data through the ad-hoc WLAN between application programs hosted on the first and second wireless communication terminals that are associated with the first application key; and
preventing data from being communicated through the ad-hoc WLAN between application programs hosted on the first and second wireless communication terminals that are not associated with the first application key.

9. A wireless communication terminal comprising:
a transceiver that is configured to transmit and receive RF signals;
a memory comprising a plurality of application programs and a plurality of application keys wherein each of the application keys is defined for a different one of the plurality of application programs; and
a Wireless Local Area Network (WLAN) controller that is configured to establish an ad-hoc WLAN with another wireless communication terminal through the transceiver using a network identifier residing within the WLAN controller and a first application key, wherein the first application key is one of the plurality of application keys, defined for a selected one of the application programs, wherein the WLAN controller is further configured to:
append the first application key to the network identifier to form a combined network identifier, wherein the memory is separate from the WLAN controller; and
respond to execution of the selected application program by broadcasting the combined network identifier as a WLAN request in an attempt to establish the ad-hoc WLAN with the other wireless communication terminal and initiate communication between the selected application program and an application program on the other wireless communication terminal having a second application key that corresponds to the first application key.

10. The wireless communication terminal of final claim 9, wherein the WLAN controller is further configured to establish the ad-hoc WLAN with the other wireless communication terminal in response to the first application key broadcast from the wireless communication terminal matching the second application key received through the transceiver from the other wireless communication terminal, wherein the received application key corresponds to the application program hosted on the second wireless communication terminal, and configured to communicate data through the established ad-hoc WLAN between the application programs hosted on the wireless communication terminals which correspond to the broadcasted and received application keys.

11. The wireless communication terminal of final claim 10, wherein:
the combined network identifier comprises a combined Service Set IDentifier (SSID); and
the WLAN controller is further configured to broadcast the combined SSID through the transceiver as an ad-hoc network connection request.

12. The wireless communication terminal of final claim 11, wherein the WLAN controller is further configured to form the combined SSID broadcast as an IEEE 802.11 formatted ad-hoc network connection request.

13. The wireless communication terminal of final claim 11, wherein the WLAN controller is further configured to receive, via the transceiver in a broadcast message from the other wireless communication terminal, the combined SSID and, in response to the combined SSID that is broadcast by the wireless communication terminal matching the combined SSID received from the other wireless communication terminal, to establish the ad-hoc WLAN between the wireless communication terminals and communicate data through the ad-hoc WLAN between the corresponding application programs hosted on the wireless communication terminals.

14. The wireless communication terminal of final claim 9, wherein the WLAN controller is further configured to establish the ad-hoc WLAN between the wireless communication terminals using their network identifiers and selected application keys, and, in response to establishing the ad-hoc WLAN, to communicate data through the ad-hoc WLAN between the selected application program and the application program on the other wireless communication terminal having the second application key that corresponds to the first application key of the selected application program.

15. The wireless communication terminal of final claim 14, further comprising:
a security kernel that is configured to block application programs hosted on the other wireless communication terminal from accessing application programs in the memory that have application keys that do not match the first application key.

16. The wireless communication terminal of final claim 9, further comprising:
a cellular transceiver that is configured to transmit and receive cellular communication signals; and
a cellular controller that is configured to communicate according to a cellular communication protocol with a cellular base station,
wherein the WLAN controller is further configured to initiate establishment of the ad-hoc WLAN with the other wireless communication terminal in response to a message received through the cellular controller and the cellular transceiver from the cellular base station.

* * * * *

UNITED STATES PATENT AND TRADEMARK OFFICE
CERTIFICATE OF CORRECTION

PATENT NO. : 7,801,100 B2  
APPLICATION NO. : 11/809982  
DATED : September 21, 2010  
INVENTOR(S) : Agardh et al.

It is certified that error appears in the above-identified patent and that said Letters Patent is hereby corrected as shown below:

Column 12, Claim 2, Lines 23 and 24: correct "terminal;"
to read -- terminal the second application key; --

Column 12, Claim 4, Line 45: correct "S SID" to read -- SSID --

Signed and Sealed this
Twenty-second Day of February, 2011

David J. Kappos
*Director of the United States Patent and Trademark Office*